US009804957B1

(12) United States Patent
Chopra et al.

(10) Patent No.: US 9,804,957 B1
(45) Date of Patent: Oct. 31, 2017

(54) BLOCK TRACKING DATA VALIDATION BACKUP MODEL

(71) Applicant: EMC IP Holding Company LLC, Hopkinton, MA (US)

(72) Inventors: Shelesh Chopra, Bangalore (IN);
Narendra Gangadhar, Bangalore (IN);
Sriram Medicharla, Bangalore (IN);
Mayur Jaswal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 60 days.

(21) Appl. No.: 14/872,218

(22) Filed: Oct. 1, 2015

(51) Int. Cl.
G06F 11/00 (2006.01)
G06F 11/36 (2006.01)

(52) U.S. Cl.
CPC ...... G06F 11/3692 (2013.01); G06F 11/3688 (2013.01)

(58) Field of Classification Search
USPC .......................................................... 714/38.1
See application file for complete search history.

(56) References Cited

U.S. PATENT DOCUMENTS

| | | | | |
|---|---|---|---|---|
| 7,464,125 B1* | 12/2008 | Orszag | ................ | G06F 11/1435 |
| 7,469,358 B2* | 12/2008 | Kaiya | ................ | G06F 11/1456 714/2 |
| 7,757,080 B1* | 7/2010 | Schilder | .............. | G06F 21/6209 713/162 |
| 7,827,150 B1* | 11/2010 | Wu | ..................... | G06F 17/3012 707/671 |
| 8,296,358 B2* | 10/2012 | Zuckerman | ....... | G06F 17/30191 709/201 |
| 8,555,087 B2* | 10/2013 | Chasen | ............ | G11B 20/00086 380/200 |
| 8,645,399 B2* | 2/2014 | McNeill | ............ | G06F 17/30303 375/240.24 |
| 8,738,870 B1* | 5/2014 | Balasubramanian | ... | G06F 12/16 711/161 |
| 8,769,224 B1* | 7/2014 | Raj | ..................... | G06F 11/1453 711/154 |
| 8,898,407 B1* | 11/2014 | Balasubramanian | | G06F 11/1451 711/161 |
| 8,966,318 B1* | 2/2015 | Shah | ................... | G06F 11/3664 714/28 |
| 9,003,227 B1* | 4/2015 | Patel | ..................... | G06F 11/165 714/15 |
| 9,032,414 B1* | 5/2015 | Dalal | ........................ | G06F 9/50 711/162 |
| 9,037,544 B1* | 5/2015 | Zheng | ............... | G06F 17/30575 707/639 |
| 9,367,402 B1* | 6/2016 | Yadav | ........................ | G06F 9/50 |
| 9,411,821 B1* | 8/2016 | Patwardhan | ...... | G06F 17/30227 |
| 9,483,358 B1* | 11/2016 | Balasubramanian | | G06F 11/1451 |

(Continued)

Primary Examiner — Kamini Patel
(74) Attorney, Agent, or Firm — Staniford Tomita LLP

(57) ABSTRACT

A user's selection of a validation test for a backup application is received. First test data responsive to the validation test is generated on a source disk. The backup application is allowed to record in a journal an event corresponding to the generation of the first test data. The journal is replayed on a destination disk to generate second test data according to the recorded event. The second test data is compared against the first test data to determine whether the backup application passed or failed the validation test.

12 Claims, 6 Drawing Sheets

(56) References Cited

U.S. PATENT DOCUMENTS

| | | | | |
|---|---|---|---|---|
| 2006/0259587 A1* | 11/2006 | Ackerman | ......... | G06Q 20/3678 709/219 |
| 2010/0042791 A1* | 2/2010 | Helman | .............. | G06F 11/1435 711/162 |
| 2011/0289345 A1* | 11/2011 | Agesen | ............... | G06F 11/2097 714/4.11 |
| 2012/0084261 A1* | 4/2012 | Parab | ................ | G06F 17/30156 707/654 |
| 2012/0144233 A1* | 6/2012 | Griffith | ............... | G06F 11/1443 714/13 |
| 2012/0204061 A1* | 8/2012 | Agesen | ............... | G06F 11/2097 714/15 |
| 2013/0067277 A1* | 3/2013 | Mummidi | ........... | G06F 11/2097 714/19 |
| 2014/0122435 A1* | 5/2014 | Chavda | ............... | G06F 11/1438 707/645 |

* cited by examiner

BLOCK TRACKING DATA VALIDATION BACKUP MODEL

TECHNICAL FIELD

Embodiments are generally directed to networked-based data backup methods, and more specifically to validating a backup application.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's digital society organizations depend on having ready access to their data. Data, however, can be lost in a variety of ways such as through accidental deletion, data corruption, disasters and catastrophes (e.g., fires or flooding), media failures (e.g., disk crash), computer viruses, and so forth.

Thus, many organizations rely on a backup application to make backups files, folders, and other data for the purpose of being able to restore them in case of data loss. In some cases, however, there can be a problem with the backup application. For example, the backup application code or algorithm may be corrupt, the file system itself may be corrupt, the backup application may not be supported by the file system, a patch to the backup application may have been applied incorrectly or may have introduced new bugs, the backup application may not be configured correctly, and so forth. As a result, the backup application may not backup the correct data. For example, data that should be backed up may not be backed up, data that should not be backed up may be backed up, or both.

The consequences for an incorrect backup can be disastrous. For example, in some cases, a user may not discover that the backup application is faulty until well after a backup has been made and a restore is needed. Therefore, there is a need for systems and techniques to validate a backup application and help ensure that the backup application will make accurate backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
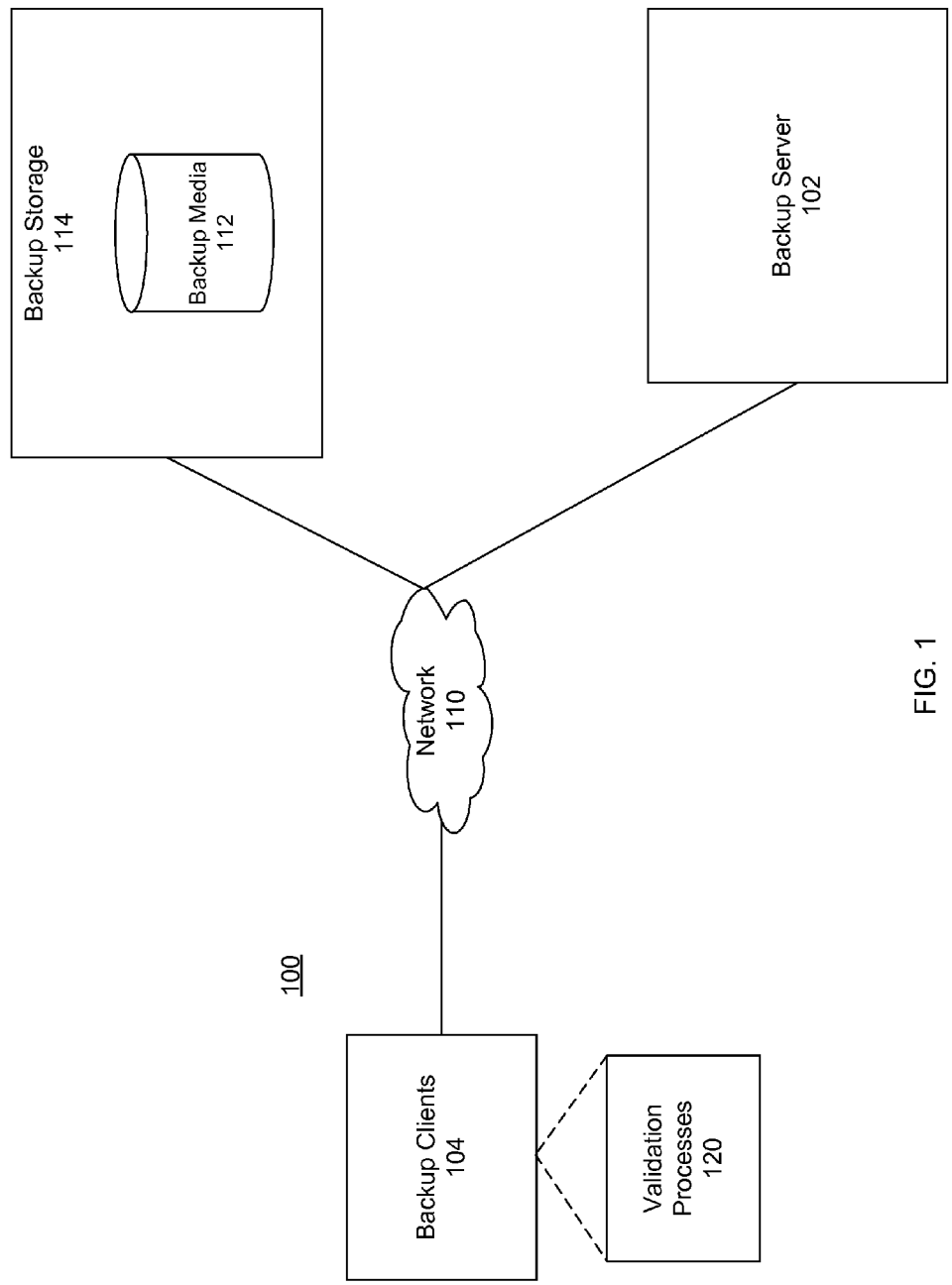
FIG. 1 is a diagram of a large-scale network implementing a data validation backup model, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for validating a backup application. The backup application can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for validating a backup application. In system 100, a number of clients 104 are provided to serve as backup clients or nodes. A network or backup server computer 102 is coupled directly or indirectly to these clients through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media 112 of a backup storage node 114. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 102, one or more backup clients 104, and backup storage node 114. A backup client executes processes for backing up data to the storage node, restoring the backed up data, and coordinating with backup server processes on the backup server and processes on the storage node. In a specific embodiment, the backup client executes processes 120 for validating a backup application. The backup server processes include processes to index the backups and identify which savesets reside on which backup devices or volumes. The backup storage node executes processes for receiving backup information from the backup client, writing data to the backup devices or volumes, sending tracking information to the backup server to track the data written to the devices or volumes, and reading the data from the devices or volumes at the request of the client during a recovery.

In an embodiment, system 100 may represent a Data Domain Replicator (DDR)-based deduplication storage system, and a storage server or node having the backup media may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
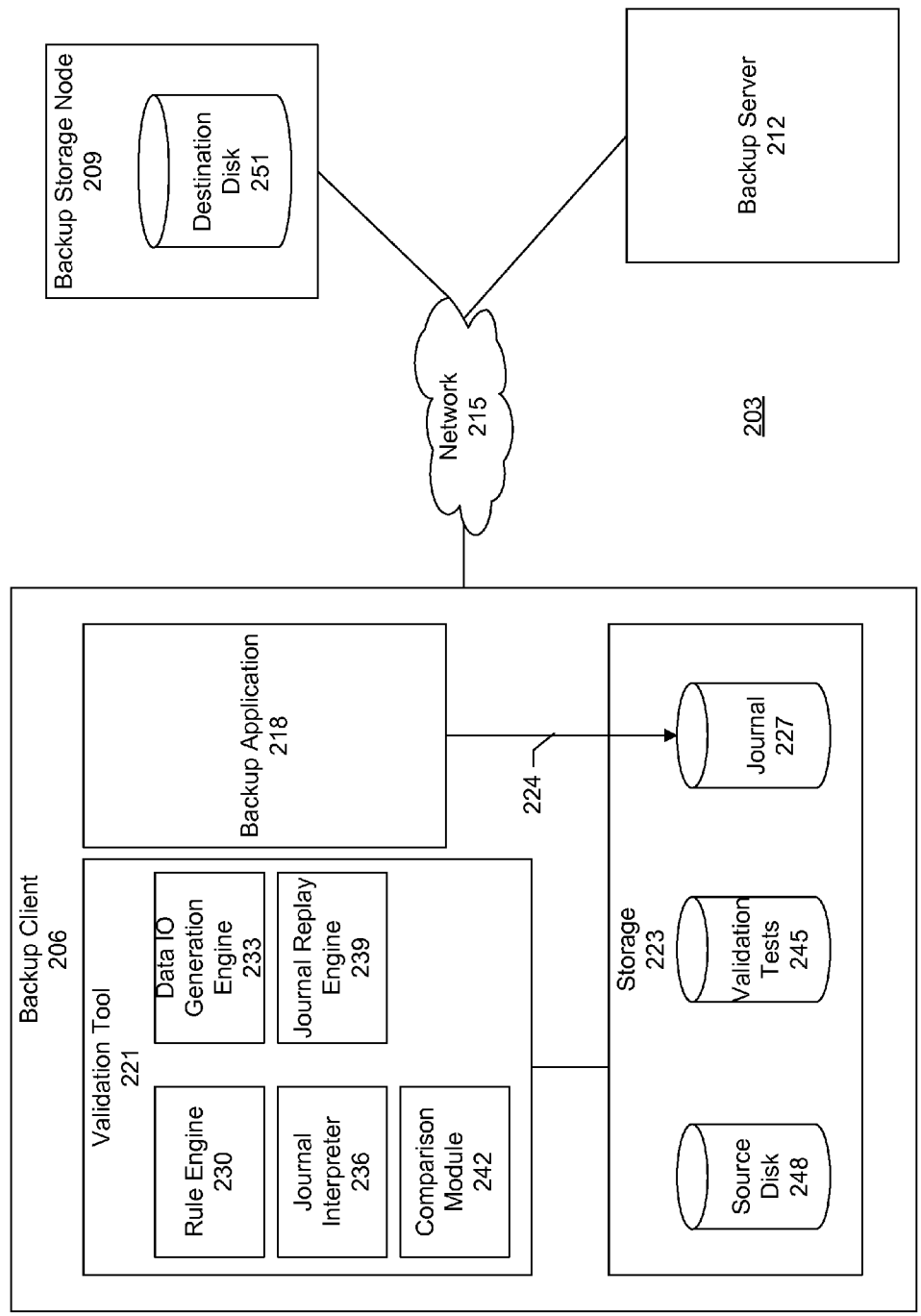
FIG. 2 shows an overall architecture of a system for validating a backup application according to a specific embodiment.

FIG. 2 shows further detail of a system 203 for validating a backup application program. This system includes a backup client 206, a backup storage node 209, and a backup server 212, each of which are interconnected by a network 215. The backup client includes a backup application program 218 and a validation tool 221. The backup client, backup server, backup storage, and network may be as shown in FIG. 1 and described above. For example, the backup client may be a general purpose computer including software and hardware such as application programs, an operating system, storage 223, memory, a processor, network interface, display or electronic screen, input device (e.g., keyboard or mouse), and so forth.

The backup application program is responsible for backing up data on the client to the backup storage node. The validation tool helps to validate that the backup application will properly backup data. The validation tool can test or validate the backup application before the backup application begins a backup. Validating the backup application before a backup begins is beneficial because a backup can take a significant amount of time to complete such as several hours or more depending upon the amount of data to be backed up and the computing resources that are available. If there might be a problem with a backup by the backup application, the validation tool can notify the user or backup administrator. This allows the user to take corrective action before investing in the time and resources to perform the backup. For example, the user may contact a vendor of the backup application or select a different backup application to use. Validating the backup application helps to provide backup administrators and other stakeholders with peace of mind and confidence knowing that the backup application will operate properly and that backups will be accurate.

Data centers, IT organizations, and others who are responsible for backups are under strenuous pressure to meet the various service level agreements (SLAs) that are characterized by the following objectives: 1) Do more with less resources; 2) Optimize the cost models; 3) Honor aggressive backup SLAs and service level objectives (SLOs); and 4) Improve the total customer experience (TCE) and reduce total cost of ownership (TCO). There have been many advancements in techniques for performing backups. As a result, today's backup applications have cut down the backup window as well as reduced the total cost of ownership.

Many backup applications use a process referred to as block-based backups. As the name suggests, the backup is performed by copying the blocks. Differential backups can be performed by copying only the new blocks from a last backup. This provides great efficiency in the way backups are taken. There are many different variants of block-based backups but a common aspect is a write tracker, agent, or logger that journals 224 the block changes and captures them in a journal 227 for further tracking. For example, the write tracker may be inserted into the operating system of the backup client to track, intercept, or filter various file system I/O operations and writes and record the events in the journal. There are many internal and external writers that are available to capture these writes.

More particularly, file system events, transactions, or storage operations may be recorded in or written to the journal. Changes to an object (e.g., a file), its attributes, or both may be recorded in the journal. The journal records which blocks have changed. During a backup, the backup application may obtain from the journal a list or identification of the blocks that should be backed up from a source (e.g., backup client) to a destination (e.g., backup storage media). Journal-based backup can increase backup performance because the backup client does not scan the local file system or contact the server to determine which files to process. Journal-based backups can also reduce network traffic between the backup client and backup storage node and server.

There is a need, however, to provide an independent validation of the backup application. For example, the backup algorithm may be faulty and capture the wrong blocks for backup. The algorithm may be corrupt and may include blocks for backup that should not be backed up. The file system itself may be corrupt, and so forth.

The validation tool shown in FIG. 2 provides a validation framework that helps to validate whether the backup application will perform a proper backup. It should be appreciated that the blocks shown in FIG. 2 can be functional rather than structural. There can be many different configurations that can perform the illustrated functions. For example, the validation tool can be used as a software development kit (SDK), an integrated validation engine in the product, or as a standalone validation engine/framework. In a specific embodiment, the validation tool is implemented as a plug-in.

The tool can be implemented as an add-in, script, macro, library, extension program, standalone program, an application programming interface (API), and so forth.

In a specific embodiment, the validation tool includes several modules, components, or code components including a rule engine 230, a data I/O generation engine 233, a journal interpreter 236, a journal replay engine 239, and a comparison module 242. Validation tests for the backup application may be stored in a repository 245. A test may be referred to as a rule. The comparison module may be referred to as a re-sync or rsync engine.

The validation tool can validate any block-based backup methodology. In a specific embodiment, components of the validation tool replay the journal logs and then compare the source and target data. Source data is production data and target data is the restored/directed restore data. If there are any anomalies between the results, the tool flags the differences as issues and generates an alert or notification to the end user. The tool is flexible in that the end user can select the rules/tests that he or she wants to run for validation.

In a specific embodiment, the rules engine provides an interface that allows the user to select the type of validation test to run. Having different validation tests allows the user to identify specific types of data or changes to test for backup. For example, if the source file system supports links such as soft links, hard links, or both. The user can test specifically for backing up such links without having to test other types of data or changes. As another example, the user may be interested in merely testing whether files that are modified will be correctly backed up. In this case, the user can select a file modification validation test and not select other validation tests that the user is not interested in. There can be a combined validation test that includes different types of validation tests. For example, the combined validation test may include tests for creating files, modifying files, renaming files, and so forth.

The interface for selecting or designating a validation test to execute may be a graphical user interface (GUI) or programmatic interface (e.g., application program interface). The rules engine decides what kind of dataset has to be generated depending upon the rules or tests specified by user. For example, repository 245 may include tests to validate the backing up of file modifications or changes, new files, renaming of files, directory modifications or changes, soft links, hard links, and so forth.

The selected rule or test can be provided as input to the data I/O generation engine. The data I/O generation engine is responsible for generating test data based on the input given by the rule engine. The test data may be referred to as dummy data. The generated test data is stored on a source disk 248. Events related to the test data generation and storage operations and transactions may be recorded by the backup application in the journal.

The journal interpreter is responsible for interpreting or parsing the information recorded in the journal file. The information may include, for example, file system events, transactions, or operations that are written in the journal file by the backup application. A particular backup application may record information in a journal using a format that is different from a format used by another backup application. In a specific embodiment, the journal interpreter may store a set of templates that can be used by the interpreter to parse any number of different journals. A template may describe the format, layout, or structure used by a particular backup application to record file system events. A template may be associated with a particular backup application. The templates allows the validation tool to validate backup applications from different developers. The validation tool may receive from a user an identification of the backup application (e.g., name and version of the backup application) that the user is planning to use for backups. Based on the identification of the backup application, the validation tool can select the appropriate template for analyzing the journal.

The journal replay engine is responsible for replaying the event captured in the journal and interpreted by the journal interpreter to a destination disk 251. The comparison module is responsible for comparing the test data between the source and destination disks. A match between the test data stored on the source and destination disks indicates that the backup application passed the selected validation test or rule. A discrepancy between the test data on the source and destination disks indicates that the backup application failed the selected validation test or rule.

Figure 3:
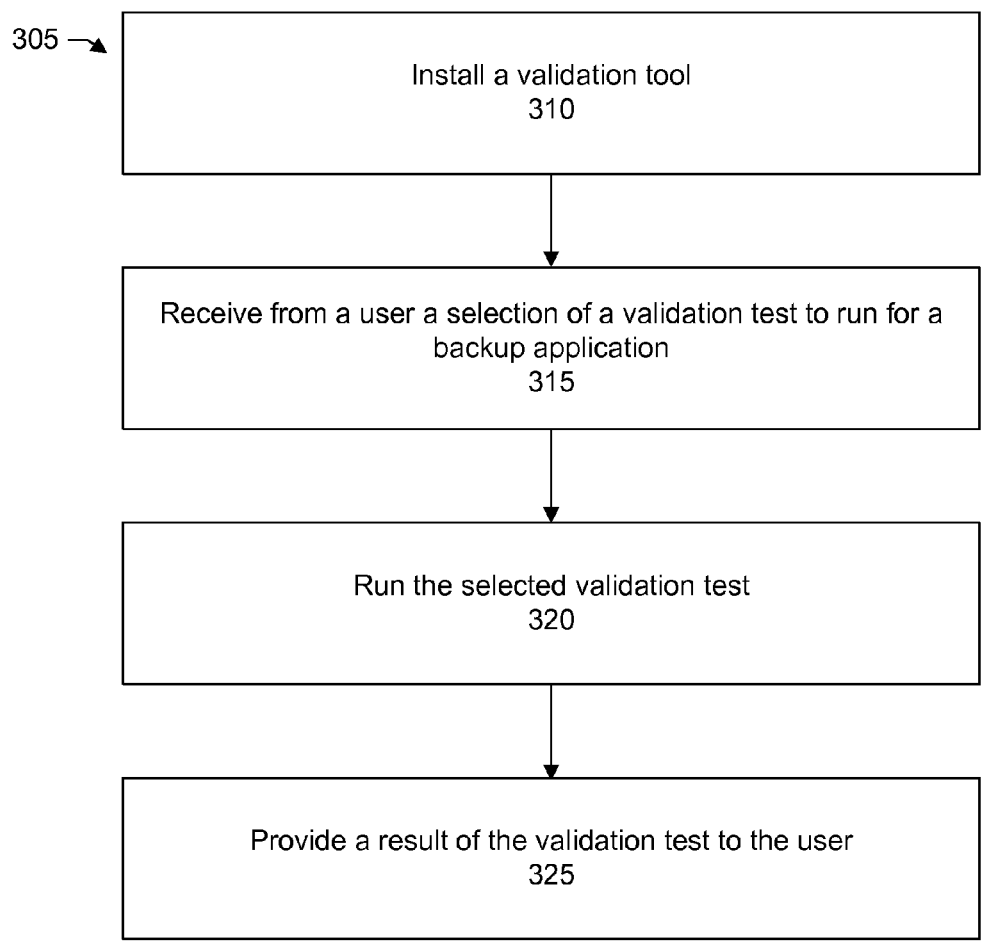
FIG. 3 shows an overall flow for validating a backup application according to a specific embodiment.

FIG. 3 shows an overall flow 305 of the validation tool. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, the validation tool or framework is installed at, for example, a backup client. In a specific embodiment, the validation tool is separate or different from a backup application that may be installed at the backup client. For example, the validation tool may execute independently of the backup application. That is, the backup application may execute or run without the validation tool having been installed. The validation tool and backup application may be from different developers or vendors. In another specific embodiment, the validation tool may be integrated with the backup application.

In a step 315, the tool presents to a user a set of validation tests or rules and receives from the user a selection of a validation test or rule to run for the backup application. A test may specify a file system operation or combination of file system operations such as creating a file, opening a file, modifying a file, writing to the file, moving a file, deleting a file, creating a directory, modifying a directory, moving a directory, deleting a directory, creating a soft link, modifying a soft link, deleting a soft link, creating a hard link, modifying a hard link, deleting a hard link, renaming a file, renaming a directory, and so forth.

In a step 320, the validation tool runs the selected validation test. In a step 325, the validation tool provides a result of the validation test to the user. For example, the result may be displayed on an electronic screen. The result may be included in a notification generated by the validation tool. The notification may be formatted as an email message, text message, or news feed item.

Figure 4:
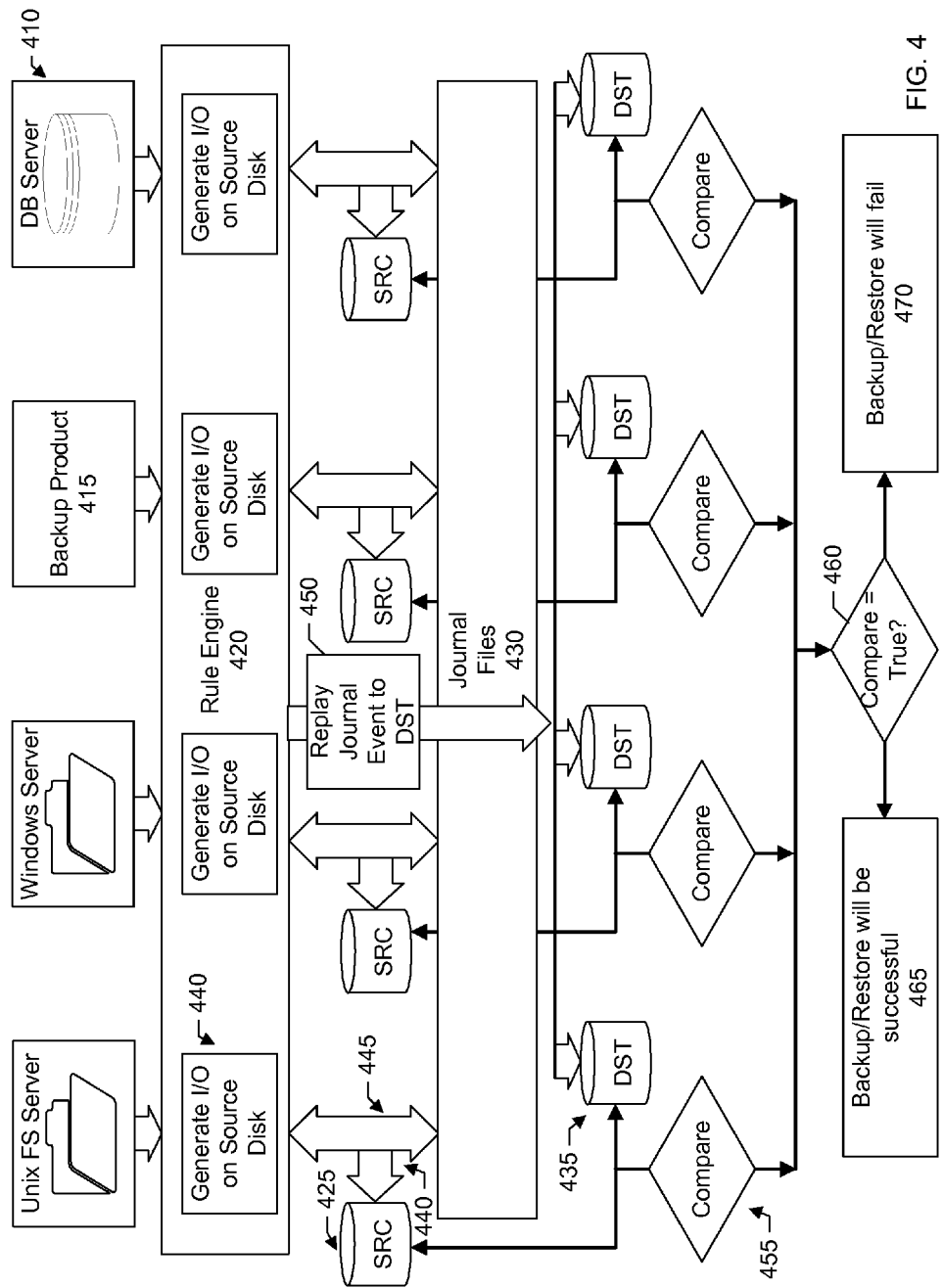
FIG. 4 shows another block diagram of a system for validating a backup application according to a specific embodiment.

FIG. 4 shows an architectural overview of the validation tool according to a specific embodiment. As shown in the example of FIG. 4, there is a set of backup clients 410, a backup product 415, a rule engine 420, source disks 425, journal files 430, and destination disks 435. The backup clients may include file servers (e.g., Unix file servers or Windows file servers), database servers, and so forth. The backup product is responsible for backing up data generated, stored, or received by the backup clients.

To validate the backup product, the rule engine directs generating I/O 440 on the source disks. That is, test data or datasets resulting from the I/O generation may be stored on a source disk. As discussed above, a file system provides for various types of operations or events such as creating a hard link, creating a soft link, modifying a file, creating a file, renaming a file, and so forth which may result in data being stored or modified on the source disk. These file system I/O operations may be recorded and tracked 445 in the journal files.

The replay engine then replays 450 the recorded journal events to a destination disk. The comparison engine compares 455 the testing data on the source and destination disks to determine 460 whether the testing data matches or is in sync. If the testing data matches (e.g., rsync=TRUE), a determination 465 is made that that a backup/restore will be successful. If the testing data does not match (e.g., rsync=FALSE), a determination 470 is made that that a backup/restore will fail.

Figure 5:
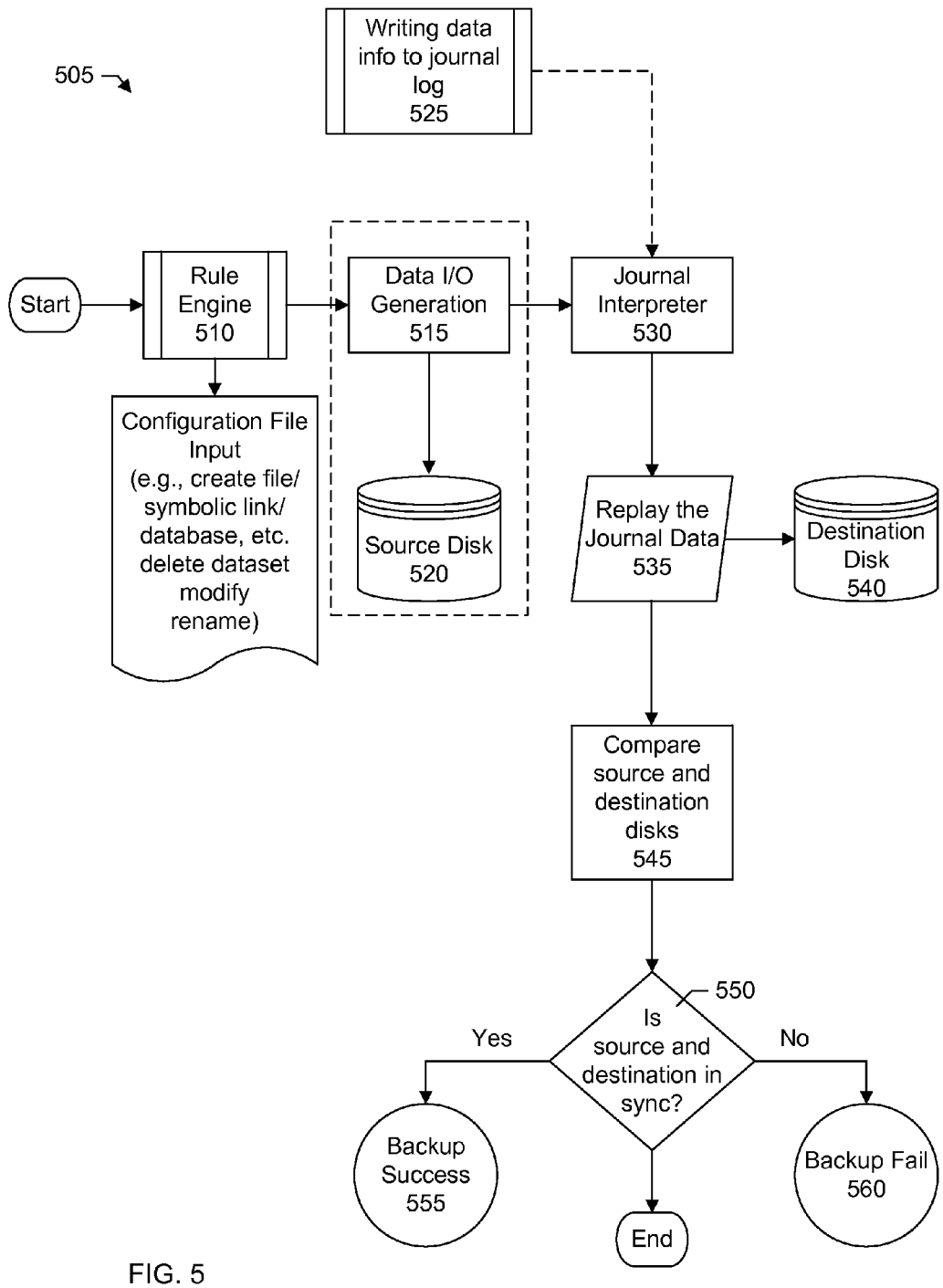
FIG. 5 shows a more detailed flow for validating a backup application according to a specific embodiment.

FIG. 5 shows a flow 505 of the validation tool according to a specific embodiment. In a step 510, the rule engine receives a specification of the type of test dataset to generate. In a specific embodiment, the rule engine accesses one or more configuration files that describe the type of test data that should be generated. A configuration file may be associated with a validation test or rule that the user has selected. The configuration file may be formatted as an extensible markup language (XML) file or other appropriate file format. The configuration files may specify various types of file system events and storage operations such as the creation, modification, deletion, and renaming of files or directories. There can be a validation test that tests whether the backup application will backup new files. For example, a configuration file associated with a validation test to test backing up new files may include the following instruction:

<create_file>test_file.txt</create_file>
<write>testing</write>

In a step 515, the instructions for the type of test data to create is passed to the data I/O generation engine. The data I/O generation engine generates the appropriate test data (e.g., first test data) according to the received instructions. In a step 520, the generated test data is stored on a source disk. For example, the file "test_file.txt" having the content "testing" may be created on the source disk according to the received instructions "<create_file>test_file.txt</create_file> and <write>testing</write>."

In a step 525, the backup application which is monitoring the source disk for changes records one or more events or operations associated with the generation and storage of the test data on the source disk. For example, in continuing with the example above, the journal may record the operations "CREATE [text_file.txt]" and "WRITE [testing] to [text_file.txt]."

In a step 530, the journal interpreter reads the journal events recorded by the backup application. In a step 535, the journal replay engine replays the journaled data against a destination disk 540 to create another set of test data (e.g., second test data) on the destination disk. In other words, the validation tool simulates or recreates on the destination disk the events according to the journal.

In a step 545, the comparison module compares the source and destination disks to determine whether the first test data written to the source disk matches or is in sync with the second test data written to the destination disk. In a specific embodiment, the comparison includes comparing bit-by-bit or file block by file block to ensure that changes to the source disk correspond to changes to the destination disk. A block can be any size of data such as single bit, a byte, or larger (e.g., 512 bytes, 2 megabytes (MB), and so forth). A block may refer to the smallest logical unit of data storage in a file system and may map to a unique address.

For example, in continuing with the example above, if the source disk includes the file "text_file.txt" having the content "testing" then the destination disk should likewise include the file "text_file.txt" having the content "testing." As another example, if a file on the source disk named "file A" is renamed to "file B" then the destination disk should likewise reflect the renaming of "file A" to "file B." Assuming no other changes to the file on the source disk, the file sizes and other attributes and metadata associated with the file should be the same. The test file names may be generated randomly. The renaming validation test can help to test whether the backup application will backup file names having special characters. For example, if a file system allows file names to have question marks, spaces, dollar signs, and so forth, it would be desirable that that the backup application likewise be able to backup such files.

Figure 6:
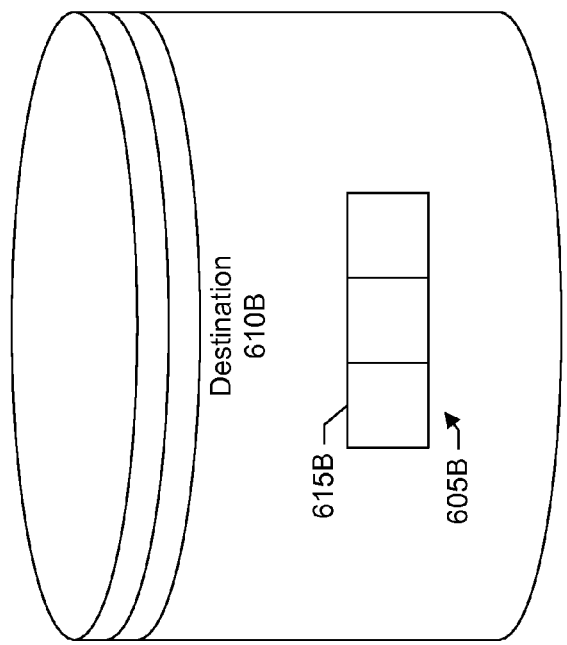
FIG. 6 shows a block diagram of comparing source and destination data according to a specific embodiment.
Figure 6:
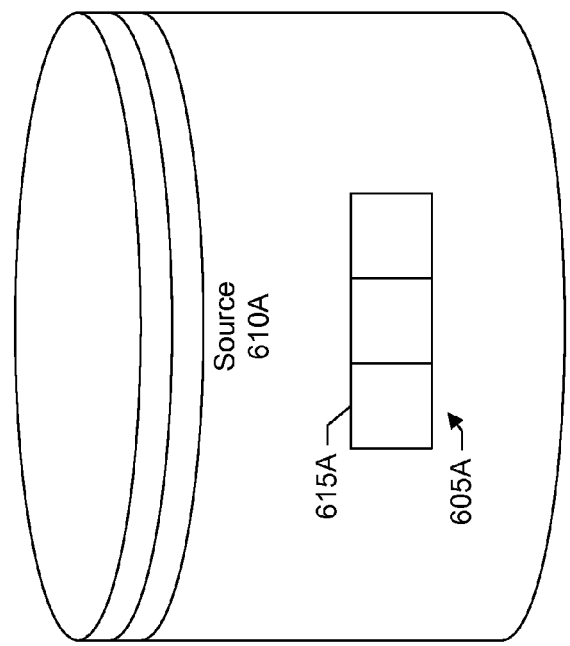

As a further example, FIG. 6 shows a block diagram of comparing files 605A and 605B on source and destination disks 610A and 610B, respectively. Files 605A and 605B may be referred to as first and second test data, respectively. In a specific embodiment, file 605A (or first test data) on the source disk is the output from the data generation I/O engine. File 605B (or second test data) on the destination disk is the result of replaying one or more recorded journal events associated with file system operations for file 605A.

As shown in the example of FIG. 6, a file may be written as a set of blocks having a predetermined block length (e.g., 2 MB). Comparing the two files (or first and second test data) may include comparing a block 615A of file 605A on the source with a corresponding block 615B of file 605B on the destination. The validation tool can track the data block locations (e.g., addresses) on the source and destination disks or file systems. In a specific embodiment, hashes or hash values may be generated for each block and compared. Matching hash values indicate no difference between the source and destination data, i.e., changes to the source file system match changes to the destination file system based on the replay of the journal. Non-matching hash values indicate a difference between the source and destination data, i.e., changes to the source file system do not match changes to the destination file system based on the replay of the journal. Any competent hash algorithm may be used.

Referring back to FIG. 5, in a step 550, a determination is made as to whether the source and destination disks are in sync, i.e., whether the first and second test data match. In a step 555, if the data is in sync or matches, the validation tool determines that the backup application has successfully passed the validation test. Alternatively, in a step 560, if the data is out of sync or does not match, the validation tool determines that the backup application has failed the validation test.

Below is another example for how a backup application may be validated according to a specific embodiment.

---
Rule: Create 10 File, Size 1K
---

In this example, there is a validation rule that specifies ten files are to be created, each having a size of 1K. Based upon the above rule, the data I/O engine will create ten random files on the source disk each of size 1K. As a result, files F1, F2, F3, F4, F5, F6, F7, F8, F9, and F10 are created and stored on the source disk. The write tracker for the backup application may (or may not if there is a problem with the write tracker) record journal entries for these operations as follows:

---
1) C|REG|F1
2) C|REG|F2
3) C|REG|F3
4) C|REG|F4
5) C|REG|F5
6) C|REG|F6
7) C|REG|F7
8) C|REG|F8
9) C|REG|F9
10) C|REG|F10
---

In this example, the identifier "C" in the journal refers to a creation event, "REG" refers to a regular file type, and "F[x]" refers to the file name (e.g., F1 . . . F10). Unix, for example, includes an identification of files as being a Regular File (REG), Directories (DIR), Symbolic Links (LNK), Named Pipe (FIFO), or Device File. A Device File can be a Character device file (CHR) or a Block device file (BLK). These file types are tracked by the validation tool.

Below are some further examples of events that may be tracked in the journal and replayed by the replay engine.

---
C|REG|1201|||/D_14/D_12/D_7/D_1/F_1||
C|DIR|2874|||/D_14/D_13||
C|FIFO|20|||/fdevice/ffile0||
C|CHR|40|||/cdevice/cfile0||
C|BLK|30|||/bdevice/bfile0||
C|LNK|2432|||/D_9/D_9/D_3/D_1_sl||
---

The validation tool can create any number of files of different file types, file extensions, or file formats (e.g., text files, database files (e.g., Microsoft SQL files), virtual hard disk files (e.g., Microsoft VHD/VHDx files), image or picture files (e.g., .jpg), audio files (e.g., .mp2), video files (e.g., .mpeg), portable document files (e.g., .pdf), executable (e.g., .exe), and so forth). This helps to test the backup application's ability to backup different types of files.

The replay engine reads the journal line by line and parses and interprets each line. For example, the first row or entry of the journal has recorded that a file of type regular and named "F1" has been created on the source disk. Thus, the replay engine will create, according to the journal entry, the file F1 on the destination disk by referring to file F1 on the source disk.

Once the replay is complete, the comparison module or Rsync engine compares the source and destination disks to confirm whether there is a match. If the backup application write tracker correctly recorded the events in the journal then the source and destination disks should match. That is, the destination disk should have files F1-F10 which correspond to files F1-10 on the source disk. However, if the backup algorithm write tracker missed something then the journal may not properly reflect the events or operations on the source disk.

For example, if the write tracker did not detect the creation of file F10 then that entry may be missing from the journal as shown in the example below.

1) C|REG|F1
2) C|REG|F2
3) C|REG|F3
4) C|REG|F4
5) C|REG|F5
6) C|REG|F6
7) C|REG|F7
8) C|REG|F8
9) C|REG|F9

As a result, when the replay engine replays the journal the destination disk will not include file F10. File F10 may be on the source disk, but may be absent or missing on the destination disk. This difference or discrepancy will then be flagged when comparing the source and destination disks.

Below is another example for how a backup application may be validated according to a specific embodiment.

Rule: Modify 1 File, Append, Append-size 1k

Based upon the above validation rule the data I/O engine will append some new blocks of size 1 k to the file (e.g., file F1). The write tracker for the backup application may (or may not if there is a problem with the write tracker) record a journal entry for these operations as follows:

M|REG|OFFSET (1024-2048)|F1

In this example, the identifier "M" in the journal refers to a modification, "REG" refers to a regular file type, "OFF-SET" specifies the address, range, or from where to where the file is modified, and "F1" is the name of the file that is modified.

The replay engine will parse the above information from the journal and will attempt to read data (from file at source disk) starting from file offset 1024 to offset 2048. And will add/write data to the file at destination from offset 1024 to 2048.

Once the replay is complete, the comparison module or Rsync engine compares the source and destination disks to confirm whether there is a match. If the write tracker/algorithm recorded everything correctly then the rsync or comparison should pass. In other words, there should be a pass if, for example, 1) file F1 is available at the source and destination, 2) a file size of file F1 at source and destination is the same, and 3) file content of file F1 at the source and destination is the same.

However, if the write tracker/algorithm did not recorded everything correctly then the rsync or comparison will fail. Consider, for example, that the writer tracker/algorithm did not record the modified offset properly. In this case, the backup may include incorrect data from the file. More particularly, the comparison may indicate that the file size on the source is different from the file size on the destination, the file content of the source is different from the file content of the destination, or both.

A validation rule or test may specify any type of file system operation or combination of operations such as create, append, overwrite, delete, move, rename, copy, symlink from/to, link from/to, and so forth, a number of test files, directories, or both upon which one or more specified file system operations will be performed, a size of a test file to create, characters or symbols to be included in a file name of a test file, characters or symbols to be included in a directory name of a test directory, a length of a file name of a test file, a length of a directory name of a test directory, letter case for a file or directory name (e.g., upper-case or lower-case), a path for a test file, an attribute, property, or metadata for a test file, content for a test file, content for a test directory, or combinations of these.

Once the validation test is complete, the validation tool may delete the test data. For example, the first test data on the source disk may be deleted. The second test data on the destination disk may be deleted. Deleting the test data, however, is optional and a user may configure the validation tool such that the test data is maintained on the source, destination, or both.

In a specific embodiment, a validation test provides for testing whether the backup application will properly backup a large numbers of files. For example, in this specific embodiment, upon the user selecting a particular validation test, the validation tool prompts the user to input a number indicating the number of test files to create. The user can input any number of files to generate. For example, the user may decide to run the test using 10, 50, 100, 1000, or more than 1000 files. The validation tool receives the specified number of test files to generate, generates the specified number of files on the source disk, allows the backup application to record events associated with the generation in the journal, replays the journal against the destination disk, and compares the source and destination disks. The comparison can determine whether the backup application properly recorded the events in the journal. For example, if the number of files on the source disk is different from the number of files on the destination disk, the validation tool may determine that the backup application failed the validation test. If the number of files on the source disk is the same as the number of files on the destination disk, the validation tool may determine that the backup application passed the validation test.

In another specific embodiment, a validation test provides for testing whether the backup application will properly backup a file of a particular size. For example, in this specific embodiment, upon the user selecting a particular validation test, the validation tool prompts the user to input a number indicating a size of the test file to create. The user can input any size of file to generate. For example, the user may decide to run the test using a small file such as a 2 megabyte (MB) file. Selecting a small file size allows the validation to be completed very quickly.

Alternatively, the user may decide to run the test using a large file. For example, the user may specify a 5, 50, 100, or more than 100 gigabyte (GB) file. The validation tool receives the specified size of file to generate, generates a file having the specified size, allows the backup application to record events associated with the generation in the journal, replays the journal against the destination disk, and compares the source and destination disks. If the size of the file on the source disk is different from a size of the file on the destination disk, the validation tool may determine that the backup application failed the validation test. If the size of the file on the source disk is the same as the size of the file on the destination disk, the validation tool may determine that the backup application passed the validation test. The user may specify a range of file sizes to test.

In a specific embodiment, validating a backup application may include creating a first test file on a source disk. The backup application may record the creation event in a journal. The recorded journal event is then replayed on a destination disk. The replaying of the journal may result in a second test file being created on the destination disk. The second test file may be compared against the first test file to determine whether the backup application passed or failed backing up a new file.

In another specific embodiment, validating a backup application may include creating multiple (e.g., two or more) first test files on a source disk. The backup application may record the creation events in a journal. The recorded journal events are then replayed on a destination disk. The replaying of the journal may result in multiple (e.g., two or more) second test files being created on the destination disk. The second test files may be compared against the first test files to determine whether the backup application passed or failed backing up multiple new files.

In another specific embodiment, validating a backup application may include creating a first test file on a source disk and, after the first test file is created, modifying the first test file to produce a first modified test file. The backup application may record the creation and modification events in a journal. The recorded journal events are then replayed on a destination disk. The replaying of the journal may result in a second test file being created on the destination disk and, after the second test file is created, a modification of the second test file according to the journal to create a second modified test file on the destination disk. The second modified test file may be compared against the first modified test file to determine whether the backup application passed or failed a file modification test.

In another specific embodiment, validating a backup application may include creating on a source disk a first test file having a first name and, after the first test file is created with the first name, renaming the first test file from the first name to a second name, different from the first name. The backup application may record the creation and renaming events in a journal. Replaying the journal on a destination disk may result in a second test file created on the destination disk having a third name. The second test file may be renamed from the third name to a fourth name. The fourth name of the second test file may be compared against the second name of the first test file to determine whether the backup application passed or failed a file renaming test.

In a specific embodiment, the validation tool may be trigged automatically. For example, the validation tool may be triggered upon detecting a backup operation. In this specific embodiment, the validation tool may pause the backup operation. Before the backup operation begins, the validation tool validates the backup application by running one or more validation tests. If the backup application passes each of the one or more validation tests, the validation tool allows the backup operation to proceed. If the backup application fails any of the one or more validation tests, the validation tool does not allow the backup operation to proceed and instead notifies the user. This allows the user to take corrective action before investing the time and resources in what might have been a faulty backup.

In a specific embodiment, the source and destination locations for validation testing purposes may be on the same backup client. For example, the validation tool may allow the user to designate a source location and a destination location. The source location may be a first folder on a backup client where first test data is to be stored. The destination location may be a second folder on the backup client where second test data is to be stored.

Below are some benefits of the validation tool according to a specific embodiment.

1) Ease of use: It is easy for anybody to perform validation.

2) Easy to deploy: Plugin and Play mechanism—Since the backup is based on a journal file no pre-setup is required before and after installing a plug-in validation tool. Upon installation of the plug-in validation tool, the tool can read the journal and perform a backup.

3) Re-usability: The validation tool can be written once used any number of times. There can be a one-time effort, as journals are fixed entities. Very little effort is required for enhancements on the plugin validation tool.

4) Reduced Regressions: It will be easy for a development team that adopts this tool and methodology to avoid regression bugs during hot fixes or patches on the build.

5) Cross Platform operability: This methodology is suitable for all the applications, file systems, and databases that adopt a journaling mechanism. Hence, the validation tool can be used as an SDK or as in-built backup validation engine.

6) Forensics: More meaningful forensics can be drawn about the product/file system in case of a crash/failure with the help of journaling, which in turn reduces the time taken to debug an issue. Specifically, the validation tool allows for easily replaying any issue.

The current state-of-the-art does not provide for an independent validation that the customer or user can trust. Issues that are found late in the backup process can be costly. There is a lack of visibility and transparency regarding checking the sanctity of the backups. There is no standard mechanism to check if the released patch can fit properly into a customer environment especially when the customer has very large volume of data. There is often an unacceptably large number of basic bugs during the testing phase which increases the life cycle of a product release. There can be a very cumbersome process of root cause analysis in the event of a backup failure especially on aged file systems or databases.

A validation tool or framework as described herein, however, provides an independent validation engine that accommodates various heterogeneity aspects. A customer can validate any backup methodology irrespective of the source/implementation. Many basic bugs that may be associated with a backup application can be eliminated at the developers site even before code check-in. Selective areas can be backed up/restored based on the information from the journal files. The validation tool helps to facilitate defect-free build of backup application patches that are delivered and released to the customer site. A customer can thoroughly test the backup application patched based on the journal before deploying the new patch into the environment. Thorough testing is especially desirable if the data is aged data. Forensics on a corrupted backup image is simplified as journals are written with respect to I/O on the source file system or database and hence can be more accurate. The validation tool can fit or integrate easily into any of automation framework. The source disk can be mobile (it can be anywhere and it can be constantly moved) since the backup is done based on journal information. This helps to enable and facilitate backups for hot pluggable devices. There is very little chance for the journal to become corrupted since the data is first written to the journal and then to the disk (only then a write is said to be committed on disk).

In a specific embodiment, a method includes receiving from a user a selection of a validation test for a backup application, generating on a source disk first test data responsive to the validation test, allowing the backup application to record in a journal an event corresponding to the generation of the first test data, replaying the journal on a destination disk to generate second test data according to the recorded event, and comparing the second test data against the first test data to determine whether the backup application passed or failed the validation test.

The method may include modifying a file to generate the first test data, the event being recorded in the journal by the backup application thereby corresponding to the file modification, replaying the file modification event recorded in the journal on the destination disk to generate the second test data, based on the comparison, if the second test data does not match the first test data, determining that the backup application does not properly backup file modifications, the backup application thereby having failed the validation test, and if the second test data does match the first test data, determining that the backup application does properly backup file modifications, the backup application thereby having passed the validation test.

The method may include renaming a file to generate the first test data, the event being recorded in the journal by the backup application thereby corresponding to the file renaming, replaying the file renaming event recorded in the journal on the destination disk to generate the second test data, based on the comparison, if the second test data does not match the first test data, determining that the backup application does not properly backup files that are renamed, the backup application thereby having failed the validation test, and if the second test data does match the first test data, determining that the backup application does properly backup files that are renamed, the backup application thereby having passed the validation test.

The method may include creating a link on the source disk to generate the first test data, the event being recorded in the journal by the backup application thereby corresponding to the creation of the link, replaying the link event recorded in the journal on the destination disk to generate the second test data, based on the comparison, if the second test data does not match the first test data, determining that the backup application does not properly backup the link, the backup application thereby having failed the validation test, and if the second test data does match the first test data, determining that the backup application does properly backup the link, the backup application thereby having passed the validation test, wherein the link comprises one of a soft link or a hard link.

The method may include modifying a directory to generate the first test data, the event being recorded in the journal by the backup application thereby corresponding to the directory modification, replaying the directory modification event recorded in the journal on the destination disk to generate the second test data, based on the comparison, if the second test data does not match the first test data, determining that the backup application does not properly backup directory modifications, the backup application thereby having failed the validation test, and if the second test data does match the first test data, determining that the backup application does properly backup directory modifications, the backup application thereby having passed the validation test.

The method may include creating two or more new test files on the source disk to generate the first test data, the event being recorded in the journal by the backup application thereby corresponding to the file creation, replaying the file creation event recorded in the journal on the destination disk to generate the second test data, based on the comparison, if the second test data does not match the first test data, determining that the backup application does not properly backup multiple new files, the backup application thereby having failed the validation test, and if the second test data does match the first test data, determining that the backup application does properly backup multiple new files, the backup application thereby having passed the validation test.

In another specific embodiment, there is a system for validating a backup application, the system comprising: a processor-based system executed on a computer system and configured to: receive from a user a selection of a validation test for the backup application, generate on a source disk first test data responsive to the validation test, allow the backup application to record in a journal an event corresponding to the generation of the first test data, replay the journal on a destination disk to generate second test data according to the recorded event, and compare the second test data against the first test data to determine whether the backup application passed or failed the validation test.

In another specific embodiment, there is a computer program product, comprising a non-transitory computer-readable medium having a computer-readable program code embodied therein, the computer-readable program code adapted to be executed by one or more processors to implement a method comprising: receiving from a user a selection of a validation test for a backup application, generating on a source disk first test data responsive to the validation test, allowing the backup application to record in a journal an event corresponding to the generation of the first test data, replaying the journal on a destination disk to generate second test data according to the recorded event, and comparing the second test data against the first test data to determine whether the backup application passed or failed the validation test.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving from a user a selection of a validation test for a backup application;
generating on a source disk first test data responsive to the validation test;
allowing the backup application to record in a journal an event corresponding to the generation of the first test data;
replaying the journal on a destination disk to generate second test data according to the recorded event;
comparing the second test data against the first test data to determine whether the backup application passed or failed the validation test;
renaming a file to generate the first test data, the event being recorded in the journal by the backup application thereby corresponding to the file renaming;
replaying the file renaming event recorded in the journal on the destination disk to generate the second test data;
based on the comparison, if the second test data does not match the first test data, determining that the backup application does not properly backup files that are renamed, the backup application thereby having failed the validation test; and if the second test data does match the first test data, determining that the backup application does properly backup files that are renamed, the backup application thereby having passed the validation test.

2. A method comprising:

receiving from a user a selection of a validation test for a backup application;

generating on a source disk first test data responsive to the validation test;

allowing the backup application to record in a journal an event corresponding to the generation of the first test data;

replaying the journal on a destination disk to generate second test data according to the recorded event;

comparing the second test data against the first test data to determine whether the backup application passed or failed the validation test;

creating a link on the source disk to generate the first test data, the event being recorded in the journal by the backup application thereby corresponding to the creation of the link;

replaying the link event recorded in the journal on the destination disk to generate the second test data;

based on the comparison, if the second test data does not match the first test data, determining that the backup application does not properly backup the link, the backup application thereby having failed the validation test; and if the second test data does match the first test data, determining that the backup application does properly backup the link, the backup application thereby having passed the validation test, wherein the link comprises one of a soft link or a hard link.

3. A method comprising:

receiving from a user a selection of a validation test for a backup application;

generating on a source disk first test data responsive to the validation test;

allowing the backup application to record in a journal an event corresponding to the generation of the first test data;

replaying the journal on a destination disk to generate second test data according to the recorded event;

comparing the second test data against the first test data to determine whether the backup application passed or failed the validation test;

modifying a directory to generate the first test data, the event being recorded in the journal by the backup application thereby corresponding to the directory modification;

replaying the directory modification event recorded in the journal on the destination disk to generate the second test data;

based on the comparison, if the second test data does not match the first test data, determining that the backup application does not properly backup directory modifications, the backup application thereby having failed the validation test; and if the second test data does match the first test data, determining that the backup application does properly backup directory modifications, the backup application thereby having passed the validation test.

4. A method comprising:

receiving from a user a selection of a validation test for a backup application;

generating on a source disk first test data responsive to the validation test;

allowing the backup application to record in a journal an event corresponding to the generation of the first test data;

replaying the journal on a destination disk to generate second test data according to the recorded event;

comparing the second test data against the first test data to determine whether the backup application passed or failed the validation test;

creating two or more new test files on the source disk to generate the first test data, the event being recorded in the journal by the backup application thereby corresponding to the file creation;

replaying the file creation event recorded in the journal on the destination disk to generate the second test data;

based on the comparison, if the second test data does not match the first test data, determining that the backup application does not properly backup multiple new files, the backup application thereby having failed the validation test; and if the second test data does match the first test data, determining that the backup application does properly backup multiple new files, the backup application thereby having passed the validation test.

5. A system for validating a backup application, the system comprising:

a processor-based system executed on a computer system and comprising a processor, wherein the processor is configured to:

receive from a user a selection of a validation test for the backup application;

generate on a source disk first test data responsive to the validation test;

allow the backup application to record in a journal an event corresponding to the generation of the first test data;

replay the journal on a destination disk to generate second test data according to the recorded event;

compare the second test data against the first test data to determine whether the backup application passed or failed the validation test;

rename a file to generate the first test data, the event being recorded in the journal by the backup application thereby corresponding to the file renaming;

replay the file renaming event recorded in the journal on the destination disk to generate the second test data;

based on the comparison, if the second test data does not match the first test data, determine that the backup application does not properly backup files that are renamed, the backup application thereby having failed the validation test; and if the second test data does match the first test data, determine that the backup application does properly backup files that are renamed, the backup application thereby having passed the validation test.

6. A system for validating a backup application, the system comprising:

a processor-based system executed on a computer system and comprising a processor, wherein the processor is configured to:

receive from a user a selection of a validation test for the backup application;

generate on a source disk first test data responsive to the validation test;

allow the backup application to record in a journal an event corresponding to the generation of the first test data;

replay the journal on a destination disk to generate second test data according to the recorded event;

compare the second test data against the first test data to determine whether the backup application passed or failed the validation test;

create a link on the source disk to generate the first test data, the event being recorded in the journal by the backup application thereby corresponding to the creation of the link;

replay the link event recorded in the journal on the destination disk to generate the second test data;

based on the comparison, if the second test data does not match the first test data, determine that the backup application does not properly backup the link, the backup application thereby having failed the validation test; and if the second test data does match the first test data, determine that the backup application does properly backup the link, the backup application thereby having passed the validation test, wherein the link comprises one of a soft link or a hard link.

7. A system for validating a backup application, the system comprising:

a processor-based system executed on a computer system and comprising a processor, wherein the processor is configured to:

receive from a user a selection of a validation test for the backup application;

generate on a source disk first test data responsive to the validation test;

allow the backup application to record in a journal an event corresponding to the generation of the first test data;

replay the journal on a destination disk to generate second test data according to the recorded event;

compare the second test data against the first test data to determine whether the backup application passed or failed the validation test;

modify a directory to generate the first test data, the event being recorded in the journal by the backup application thereby corresponding to the directory modification;

replay the directory modification event recorded in the journal on the destination disk to generate the second test data;

based on the comparison, if the second test data does not match the first test data, determine that the backup application does not properly backup directory modifications, the backup application thereby having failed the validation test; and if the second test data does match the first test data, determine that the backup application does properly backup directory modifications, the backup application thereby having passed the validation test.

8. A system for validating a backup application, the system comprising:

a processor-based system executed on a computer system and comprising a processor, wherein the processor is configured to:

receive from a user a selection of a validation test for the backup application;

generate on a source disk first test data responsive to the validation test;

allow the backup application to record in a journal an event corresponding to the generation of the first test data;

replay the journal on a destination disk to generate second test data according to the recorded event;

compare the second test data against the first test data to determine whether the backup application passed or failed the validation test;

create two or more new test files on the source disk to generate the first test data, the event being recorded in the journal by the backup application thereby corresponding to the file creation;

replay the file creation event recorded in the journal on the destination disk to generate the second test data;

based on the comparison, if the second test data does not match the first test data, determine that the backup application does not properly backup multiple new files, the backup application thereby having failed the validation test; and if the second test data does match the first test data, determine that the backup application does properly backup multiple new files, the backup application thereby having passed the validation test.

9. A computer program product, comprising a non-transitory computer-readable medium having a computer-readable program code embodied therein, the computer-readable program code adapted to be executed by one or more processors to implement a method comprising:

receiving from a user a selection of a validation test for a backup application;

generating on a source disk first test data responsive to the validation test;

allowing the backup application to record in a journal an event corresponding to the generation of the first test data;

replaying the journal on a destination disk to generate second test data according to the recorded event;

comparing the second test data against the first test data to determine whether the backup application passed or failed the validation test;

renaming a file to generate the first test data, the event being recorded in the journal by the backup application thereby corresponding to the file renaming;

replaying the file renaming event recorded in the journal on the destination disk to generate the second test data;

based on the comparison, if the second test data does not match the first test data, determining that the backup application does not properly backup files that are renamed, the backup application thereby having failed the validation test; and if the second test data does match the first test data, determining that the backup application does properly backup files that are renamed, the backup application thereby having passed the validation test.

10. A computer program product, comprising a non-transitory computer-readable medium having a computer-readable program code embodied therein, the computer-readable program code adapted to be executed by one or more processors to implement a method comprising:

receiving from a user a selection of a validation test for a backup application;

generating on a source disk first test data responsive to the validation test;

allowing the backup application to record in a journal an event corresponding to the generation of the first test data;

creating a link on the source disk to generate the first test data, the event being recorded in the journal by the backup application thereby corresponding to the creation of the link;

replaying the link event recorded in the journal on the destination disk to generate the second test data;

based on the comparison, if the second test data does not match the first test data, determining that the backup application does not properly backup the link, the backup application thereby having failed the validation test; and if the second test data does match the first test data, determining that the backup application does properly backup the link, the backup application thereby having passed the validation test, wherein the link comprises one of a soft link or a hard link.

11. A computer program product, comprising a non-transitory computer-readable medium having a computer-readable program code embodied therein, the computer-readable program code adapted to be executed by one or more processors to implement a method comprising:

receiving from a user a selection of a validation test for a backup application;

generating on a source disk first test data responsive to the validation test;

allowing the backup application to record in a journal an event corresponding to the generation of the first test data;

modifying a directory to generate the first test data, the event being recorded in the journal by the backup application thereby corresponding to the directory modification;

replaying the directory modification event recorded in the journal on the destination disk to generate the second test data;

based on the comparison, if the second test data does not match the first test data, determining that the backup application does not properly backup directory modifications, the backup application thereby having failed the validation test; and if the second test data does match the first test data, determining that the backup application does properly backup directory modifications, the backup application thereby having passed the validation test.

12. A computer program product, comprising a non-transitory computer-readable medium having a computer-readable program code embodied therein, the computer-readable program code adapted to be executed by one or more processors to implement a method comprising:

receiving from a user a selection of a validation test for a backup application;

generating on a source disk first test data responsive to the validation test;

allowing the backup application to record in a journal an event corresponding to the generation of the first test data;

creating two or more new test files on the source disk to generate the first test data, the event being recorded in the journal by the backup application thereby corresponding to the file creation;

replaying the file creation event recorded in the journal on the destination disk to generate the second test data;

based on the comparison, if the second test data does not match the first test data, determining that the backup application does not properly backup multiple new files, the backup application thereby having failed the validation test; and if the second test data does match the first test data, determining that the backup application does properly backup multiple new files, the backup application thereby having passed the validation test.

* * * * *